United States Patent
Motsch et al.

(10) Patent No.: US 10,738,624 B2
(45) Date of Patent: Aug. 11, 2020

(54) ROTOR DEVICE OF A TURBOMACHINE

(71) Applicant: Rolls-Royce Deutschland Ltd & Co Kg, Blankenfelde-Mahlow (DE)

(72) Inventors: Sebastian Motsch, Berlin (DE); Thomas Schiessl, Rangsdorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 168 days.

(21) Appl. No.: 15/965,057

(22) Filed: Apr. 27, 2018

(65) Prior Publication Data

US 2018/0328195 A1    Nov. 15, 2018

(30) Foreign Application Priority Data

May 9, 2017    (DE) .................. 10 2017 109 952

(51) Int. Cl.
   *F01D 5/08*    (2006.01)
   *F01D 5/30*    (2006.01)

(52) U.S. Cl.
   CPC ........... *F01D 5/3015* (2013.01); *F01D 5/081* (2013.01); *F05D 2220/323* (2013.01);
   (Continued)

(58) Field of Classification Search
   CPC .... F01D 5/3015; F01D 5/081; F05D 2260/30; F05D 2260/20; F05D 2240/20; F05D 2220/323
   See application file for complete search history.

(56) References Cited

U.S. PATENT DOCUMENTS

RE21,272 E * 11/1939 Hallerberg ........... F02M 35/026
                                                              96/233
2,651,496 A * 9/1953 Buckland ................ F01D 9/065
                                                              415/135
(Continued)

FOREIGN PATENT DOCUMENTS

DE          19854908 A1    5/2000
DE      102015111750 A1    1/2017
(Continued)

OTHER PUBLICATIONS

Chanteloup (WO 2010076492 A1) Machine Translation (Year: 2010).*
(Continued)

*Primary Examiner* — Woody A Lee, Jr.
*Assistant Examiner* — Brian Christopher Delrue
(74) *Attorney, Agent, or Firm* — Shuttleworth & Ingersoll, PLC; Timothy Klima (57) ABSTRACT

A rotor device of a turbomachine, having a disc wheel and a plurality of rotor blades that are arranged circumferentially inside recesses of the disc wheel and that are fixed at the disc wheel in the axial direction by means of a securing appliance. At least one flow channel that extends at least substantially in the axial direction is assigned to each recess. The securing appliance has a plurality of recesses, wherein a number and arrangement of the recesses is chosen such that the entire cross-sectional surface of the securing appliance passable by the flow, which is defined as the sum of an overlap of the recesses with at least one flow channel as viewed in the axial direction, is substantially independent of a circumferential position of the securing appliance relative to the disc wheel.

9 Claims, 7 Drawing Sheets

US 10,738,624 B2

Page 2

(52) U.S. Cl.
CPC ...... *F05D 2240/20* (2013.01); *F05D 2260/20* (2013.01); *F05D 2260/30* (2013.01)

(56) References Cited

U.S. PATENT DOCUMENTS

| | | | | |
|---|---|---|---|---|
| 2,835,515 | A * | 5/1958 | Solari | F16J 15/38 277/397 |
| 2,936,155 | A * | 5/1960 | Howell | F01D 5/22 416/134 R |
| 3,303,992 | A * | 2/1967 | Johnson | F01D 17/162 415/149.4 |
| 3,487,879 | A * | 1/1970 | McCarthy | F04D 29/36 416/220 R |
| 3,843,279 | A * | 10/1974 | Crossley | F01D 9/042 415/191 |
| 3,870,434 | A * | 3/1975 | Paulson | F01D 7/00 416/160 |
| 3,887,297 | A * | 6/1975 | Welchek | F01D 17/162 415/161 |
| 3,929,392 | A * | 12/1975 | Ogino | F16C 17/02 384/215 |
| 4,047,840 | A * | 9/1977 | Ravenhall | F04D 29/323 416/135 |
| 4,217,755 | A * | 8/1980 | Williams | F02C 7/18 415/115 |
| 4,363,600 | A * | 12/1982 | Thebert | F01D 17/162 415/140 |
| 4,498,790 | A * | 2/1985 | Fisher | F01D 17/162 384/296 |
| 4,514,141 | A * | 4/1985 | Marey | F01D 17/162 415/160 |
| 4,604,030 | A * | 8/1986 | Naudet | F01D 11/001 415/126 |
| 4,706,354 | A * | 11/1987 | Naudet | F01D 17/162 29/428 |
| 4,834,613 | A * | 5/1989 | Hansen | F01D 17/162 415/160 |
| 4,835,827 | A * | 6/1989 | Marra | F01D 5/027 29/407.01 |
| 4,848,182 | A * | 7/1989 | Novotny | F01D 5/027 464/180 |
| 4,861,228 | A * | 8/1989 | Todman | F01D 17/162 415/115 |
| 4,877,376 | A * | 10/1989 | Sikorski | B64C 11/04 416/207 |
| 4,879,792 | A * | 11/1989 | O'Connor | F01D 5/027 29/889 |
| 4,882,902 | A * | 11/1989 | Reigel | F01D 5/082 60/806 |
| 4,890,981 | A * | 1/1990 | Corsmeier | F01D 5/3015 416/220 R |
| 4,990,056 | A * | 2/1991 | McClain | F01D 11/001 29/889.22 |
| 5,022,824 | A * | 6/1991 | Violette | B64C 11/008 416/230 |
| 5,030,063 | A * | 7/1991 | Berger | F01D 5/3015 416/220 R |
| 5,102,302 | A * | 4/1992 | Schilling | B64C 11/04 416/134 A |
| 5,165,856 | A * | 11/1992 | Schilling | B64C 11/04 416/204 A |
| 5,167,167 | A * | 12/1992 | Tiernan, Jr. | F16F 15/32 29/894 |
| 5,205,714 | A * | 4/1993 | Shah | B64C 11/04 416/217 |
| D341,145 | S * | 11/1993 | Esworthy | D15/143 |
| 5,259,728 | A * | 11/1993 | Szpunar | F01D 5/3007 416/2 |
| 5,324,165 | A * | 6/1994 | Charbonnel | F01D 11/003 415/160 |
| 5,440,874 | A * | 8/1995 | Charier | F01D 5/081 415/115 |
| 5,575,616 | A * | 11/1996 | Hagle | F01D 5/081 415/115 |
| 5,636,968 | A * | 6/1997 | Audet | F01D 17/162 415/160 |
| 5,664,536 | A * | 9/1997 | Bigsby | F16J 9/24 123/193.4 |
| 5,700,130 | A * | 12/1997 | Barbot | F01D 5/081 415/115 |
| 5,796,199 | A * | 8/1998 | Charbonnel | F01D 17/162 310/60 A |
| 5,954,477 | A * | 9/1999 | Balsdon | F01D 11/006 415/173.7 |
| 6,022,190 | A * | 2/2000 | Schillinger | F01D 5/081 415/115 |
| 6,086,327 | A * | 7/2000 | Mack | F01D 17/162 384/273 |
| 6,129,512 | A * | 10/2000 | Agram | F01D 17/162 415/160 |
| 6,257,593 | B1 * | 7/2001 | White | F16J 15/064 277/630 |
| 6,290,464 | B1 * | 9/2001 | Negulescu | F01D 1/32 416/239 |
| 6,435,519 | B1 * | 8/2002 | White | F16J 15/0806 277/609 |
| 6,457,721 | B1 * | 10/2002 | Bloemers | F16J 9/24 277/445 |
| 6,481,960 | B2 * | 11/2002 | Bowen | F01D 11/001 415/160 |
| 6,550,779 | B2 * | 4/2003 | Bjornson | F16J 15/3488 277/370 |
| 6,588,298 | B2 * | 7/2003 | Czerniak | F01D 5/027 416/145 |
| 6,637,995 | B1 * | 10/2003 | White | F16B 19/02 411/339 |
| 6,682,299 | B2 * | 1/2004 | Bowen | F01D 9/02 384/273 |
| 6,790,000 | B2 * | 9/2004 | Wolf | F01D 17/162 415/165 |
| D517,900 | S * | 3/2006 | Goldenberg | D8/354 |
| 7,244,098 | B2 * | 7/2007 | Bromann | F01D 17/162 415/160 |
| 7,360,990 | B2 * | 4/2008 | Barbe | F01D 17/162 384/296 |
| 7,510,369 | B2 * | 3/2009 | Lytle | F01D 17/162 29/889.22 |
| 7,670,106 | B2 * | 3/2010 | Bouru | F01D 9/042 415/148 |
| 8,038,399 | B1 * | 10/2011 | Liang | F01D 5/082 415/230 |
| 8,328,512 | B2 * | 12/2012 | Major | F01D 17/162 415/209.4 |
| 8,342,804 | B2 * | 1/2013 | Pronovost | F01D 5/027 416/144 |
| 8,348,616 | B2 * | 1/2013 | Williams | F01D 5/027 416/119 |
| D681,512 | S * | 5/2013 | Verbowski | D12/159 |
| 8,448,993 | B2 * | 5/2013 | Cumic | F16L 21/022 285/112 |
| 8,579,538 | B2 * | 11/2013 | Juh | F01D 5/066 403/359.5 |
| 8,770,930 | B2 * | 7/2014 | Merrill | F01D 5/147 29/889.21 |
| 8,888,458 | B2 * | 11/2014 | Billings | F01D 5/027 416/144 |
| 8,951,010 | B2 * | 2/2015 | Major | F01D 17/162 415/209.4 |
| 9,353,643 | B2 * | 5/2016 | Major | F01D 17/162 |
| 9,874,243 | B2 * | 1/2018 | McKinnon | F16C 33/046 |
| 9,926,944 | B2 * | 3/2018 | Mouton | F01D 17/162 |
| 9,932,988 | B2 * | 4/2018 | Maliniak | F04D 29/563 |
| 9,970,314 | B2 * | 5/2018 | Stiehler | F01D 9/042 |
| 10,041,362 | B2 * | 8/2018 | Belshaw | F01D 5/081 |
| 10,125,789 | B2 * | 11/2018 | Maliniak | F04D 29/563 |
| 10,280,941 | B2 * | 5/2019 | Mouton | F01D 17/162 |
| 10,287,904 | B2 * | 5/2019 | Filipenco | F01D 9/04 |
| 10,344,622 | B2 * | 7/2019 | Amadon | F04D 29/522 |

(56) References Cited

U.S. PATENT DOCUMENTS

| | | | | |
|---|---|---|---|---|
| 2003/0113204 A1* | 6/2003 | Wolf | F01D 17/162 | 415/165 |
| 2003/0170115 A1* | 9/2003 | Bowen | F01D 9/02 | 415/160 |
| 2007/0059161 A1* | 3/2007 | Bouru | F01D 17/162 | 415/160 |
| 2007/0166151 A1* | 7/2007 | Burdgick | F01D 9/044 | 415/191 |
| 2008/0031730 A1* | 2/2008 | Houradou | F01D 17/162 | 415/173.2 |
| 2009/0004012 A1* | 1/2009 | Caprario | F01D 5/082 | 416/189 |
| 2010/0014986 A1* | 1/2010 | Traverso | F01D 5/081 | 416/97 R |
| 2010/0080689 A1* | 4/2010 | Lee | F01D 5/027 | 415/119 |
| 2011/0129342 A1* | 6/2011 | Smoke | F01D 5/087 | 416/95 |
| 2011/0142651 A1* | 6/2011 | Lhoest | F01D 5/26 | 416/182 |
| 2011/0197703 A1* | 8/2011 | Badre-Alam | B64C 11/008 | 74/574.1 |
| 2012/0051918 A1* | 3/2012 | Glasspoole | F01D 5/025 | 416/204 A |
| 2012/0319360 A1* | 12/2012 | Blaney | F01D 11/08 | 277/590 |
| 2014/0234086 A1* | 8/2014 | Maliniak | F04D 29/563 | 415/159 |
| 2015/0098813 A1* | 4/2015 | Jarrett, Jr. | F01D 9/042 | 415/209.3 |
| 2016/0097287 A1* | 4/2016 | Goldfinch | F01D 5/326 | 416/220 R |
| 2016/0208637 A1* | 7/2016 | Maliniak | F01D 17/162 | |
| 2016/0251962 A1* | 9/2016 | Hashimoto | F02C 7/18 | 60/806 |
| 2016/0273370 A1* | 9/2016 | Belshaw | F01D 5/081 | |
| 2016/0290360 A1* | 10/2016 | Tanaka | F01D 25/243 | |
| 2016/0363133 A1* | 12/2016 | Mouton | F01D 17/162 | |
| 2016/0376891 A1* | 12/2016 | Bricaud | F01D 5/081 | 416/1 |
| 2017/0022818 A1* | 1/2017 | Weinert | F01D 5/087 | |
| 2017/0362958 A1* | 12/2017 | Von Berg | F01D 25/164 | |
| 2018/0023408 A1* | 1/2018 | Rice | F01D 11/08 | 415/173.1 |
| 2018/0023420 A1* | 1/2018 | Amadon | F01D 9/041 | 415/209.2 |
| 2019/0127045 A1* | 5/2019 | Devaux | B64C 11/14 | |

FOREIGN PATENT DOCUMENTS

| | | | | |
|---|---|---|---|---|
| EP | 1760272 A2 * | 3/2007 | | F01D 17/162 |
| EP | 3070268 A2 | 9/2016 | | |
| EP | 3109402 A1 | 12/2016 | | |
| GB | 705150 A * | 3/1954 | | F01D 9/065 |
| WO | WO-2010076492 A1 * | 7/2010 | | F01D 5/081 |
| WO | WO2010076492 A1 | 7/2010 | | |
| WO | WO-2015155442 A1 * | 10/2015 | | F01D 9/041 |

OTHER PUBLICATIONS

German Search Report dated Mar. 26, 2018 for counterpart German Application No. DE 10 2017 109 952.2.

European Search Report dated Aug. 6, 2018 for counterpart European Patent Application No. 18170440.4.

* cited by examiner

ROTOR DEVICE OF A TURBOMACHINE

This application claims priority to German Patent Application DE102017109952.2 filed May 9, 2017, the entirety of which is incorporated by reference herein.

The invention relates to a rotor device of a turbomachine with a disc wheel and a plurality of rotor blades that are circumferentially arranged inside recesses of the disc wheel and are fixed at the disc wheel in the axial direction by means of a securing appliance, according to the kind as it is defined more closely in the generic term of patent claim 1.

What is for example known from U.S. Pat. No. 6,022,190 A is a rotor device of a turbomachine that is embodied as a jet engine and configured with a disc wheel and rotor blades circumferentially connected therewith. The rotor blades have blade roots that have a fir-tree or dovetail shape in the cross section and via which the rotor blades are arranged inside recesses or receiving grooves extending inside the disc wheel in the axial direction. For axial securing of the rotor blades at the disc wheel, a securing appliance or a securing ring is provided, which may be embodied in as a one-piece component or may have multiple securing segments. In a radially inner area, the securing appliance is arranged inside a groove of the disc wheel, and in a radially outer area is arranged inside a groove of the rotor blades.

Here, it is known to use cooling air of a secondary cooling air system for cooling the rotor blades, for example. To be able to use the cooling air for cooling rotor blades of multiple stages, the cooling air is guided through the flow channels in the area of the receiving grooves for the rotor blades from an upstream side of the rotor device to a downstream side of the rotor device. Usually recesses or passage openings for the cooling air flow are arranged in the securing appliance that is in particular arranged on a downstream side of the disc wheel, wherein a recess is assigned to each rotor blade. The cooling air flow that is guided through the flow channels can be influenced or adjusted by means of the cross-sectional surface of the recesses.

Together with the flow channels all recesses define a free total cross section that is opened for the cooling air to pass through, so that the recesses can be used as a restrictor corresponding to the requirements of the secondary cooling air system. Thus, the free flow cross section results from an overlap of the recesses with the respective flow channel as viewed in the axial direction, and is at its maximum if the recesses are not covered by the rotor blades and/or the disc wheel. What is used in known rotors in order to avoid such an overlap are anti-rotation features that are supposed to avoid twisting of the securing appliance in the circumferential direction and are supposed to ensure that a free flow cross section of all recesses remains the same and thus the recesses are at no point covered by the disc wheel or a rotor blade in the axial direction.

At that, a maximal free flow cross section to be obtained is delimited by tolerances in the area of the anti-rotation feature. To enlarge the total free flow cross section, it is known to minimize manufacturing tolerances and/or to reduce tolerances in the area of the anti-rotation feature of the securing appliance. Such measures are disadvantageously elaborate and cost-intensive, and result in large structural components with an undesirably high component weight.

In order to avoid an anti-rotation feature, it is further known to provide a circumferential buffer area between the wheel head and the securing appliance that is formed by setting up an area of the disc appliance that is facing towards the disc wheel in the area of the recesses. In this manner, an enlargement of a total flow cross sections is achieved.

Disadvantageously, in such an embodiment a securing appliance and a head area of the disc wheel have a greater extension in the axial direction with an associated increase in weight. In addition, such a securing appliance has to be embodied in solid design in particular to withstand mechanical loads that act in the area of the set-up area during operation.

Thus, the present invention is based on the objective to provide a rotor device with a simple structure, in which a total cross-sectional surface that is passable by the flow is independent of the circumferential position of a securing appliance, and thus renders an anti-rotation feature superfluous.

This objective is achieved through a rotor device with features as disclosed herein.

What is proposed is a rotor device of a turbomachine that has a disc wheel and a plurality of rotor blades that are arranged circumferentially in particular in fir tree-shaped recesses of the disc wheel and are fixed at the disc wheel in the axial direction by means of a securing appliance, wherein at least one flow channel that extends at least substantially in the axial direction is assigned to each recess, and wherein the securing appliance has a plurality of recesses.

According to the invention, a number and arrangement of the recesses is chosen in such a manner that the total cross-sectional surface of the securing appliance that is passable by the flow and that is defined as the sum of an overlap of the recesses with at least one flow channel as viewed in the axial direction is substantially independent of a circumferential position of the securing appliance relative to the disc wheel.

Due to the fact that a twisting of the axial securing appliance by any given angle relative to a longitudinal axis does substantially not result in any change of the total cross-sectional surface of the securing appliance passable by the flow, the rotor device according to the invention has the advantage that the total cross-sectional surface passable by the flow is independent of any twisting that occurs during operation, and that no anti-rotation feature is necessary, or that an anti-rotation feature embodied with large tolerances can be provided. With such an axial securing appliance, the rotor device can be realized to be correspondingly small, low-weight, and cost-effective.

In contrast to known rotor devices, in the solution according to the invention it is not necessary that the recesses of the securing appliance are completely overlapping with a flow channel in every operational state in order to achieve a desired cooling air flow. In the solution according to the invention, individual or multiple recesses can at least temporarily be covered by a rotor blade and/or the disc wheel in certain areas or also completely independently of the operational state, so that the total cross-sectional surface that can be passed by the flow in every operational state can additionally be chosen to be larger than in known solutions.

Generally, the solution according to the invention allows for a simplified, standardized and robust wheel head construction, wherein there is the possibility of using identically embodied disc wheels or webs between the recesses for blade reception, usually so-called fir tree fingers, in a large number of applications, so that it is in particular possible to realize different stages of the turbomachine in a cost-effective manner.

In an advantageous embodiment of a rotor device according to the invention, at least one recess of the securing appliance is assigned to a flow area that is arranged in the radial direction between a rotor blade root and a groove base of the recess of the disc wheel, representing a so-called bucket groove area.

Alternatively or additionally, at least one recess of the securing appliance can be assigned to a flow channel that is arranged in the radial direction between a head area of the webs of the disc wheel that form the recesses in the circumferential direction and a lower platform area of the rotor blades that is facing towards the disc wheel.

A total cross-sectional surface of the securing appliance passable by the flow that is substantially constant in all operational states can be achieved in a simple manner if the recesses of the securing appliance have a substantially identical distance to a central axis of the rotor device, i.e. if they are arranged on a pitch circle or a circle line about the central axis of the rotor device.

In an advantageous further development of the invention, further recesses can be arranged at least substantially on a further pitch circle or a further circle line about the central axis of the rotor device, and thus with a different distance from the central axis of the rotor device. Two or more cross-sectional areas can be provided, with recesses being respectively arranged in their edge area.

In principle, it can also be provided that the recesses are arranged in the securing appliance in a stochastically distributed manner.

In an advantageous embodiment of a rotor device according to the invention, all recesses having a substantially identical distance to the central axis are arranged in a uniformly distributed manner in the circumferential direction.

In an arrangement of the recesses that is very advantageous with respect to the installation space, at least a part of the recesses forms an edge area of the securing appliance in the radial direction, wherein also an effective edge sealing can be achieved in this manner.

The recesses of the securing appliance can principally be designed in any desired manner, wherein a circular, rectangular or slot-shaped embodiment is expedient from the production-technological perspective. In a slot-shaped embodiment of the recess, which represents an oblong hole, it is advantageous if it extends in the circumferential direction i.e. if a length of the recess in the circumferential direction is greater than its height in the radial direction. Here, a slot-shaped recess can have a linear course as well as a curved course in particular in the circumferential direction, and can preferably be embodied in such a manner that it has at least a small free or passable flow cross section in every circumferential position of the securing appliance.

In order to facilitate an interaction of a recess with at least two flow channels adjoining each other in the circumferential direction, it is advantageous if a slot-shaped recess has a greater extension in the circumferential direction than the width of the web in this radial area.

In particular with slot-shaped recesses, the number of recesses with a substantially identical distance from the central axis of the rotor device can be identical to the number of recesses of the disc wheel or to the number of rotor blades, but can also differ from the number of the recesses of the disc wheel and thus of the rotor blades in other embodiments. Mathematically, a particularly advantageous embodiment results if the number of the recesses is coprime.

In a rotor device embodied according to the invention, the securing appliance can be realized as a substantially completely circumferential securing ring. Alternatively, the securing appliance can have a plurality of securing segments that are arranged to be distributed with respect to each other in the circumferential direction, wherein each securing segment acts together with one, two, tree or multiple rotor blades in the circumferential direction.

In principle, the rotor device according to the invention can be used in turbomachines that are embodied as stationary gas turbines as well as in turbomachines that form jet engines, wherein the rotor device can be part of any stage of a turbine or a compressor.

The features specified in the patent claims as well as the features specified in the following exemplary embodiments of the rotor device according to the invention are suitable to further develop the subject matter according to the invention respectively on their own or in any desired combination with each other.

Further advantages and advantageous embodiments of a rotor device according to the invention follow from the patent claims and from the exemplary embodiments that are described in principle in the following by referring to the drawing, wherein, with a view to clarity, the same reference signs are used in the description of the exemplary embodiments for structural components having the same structure and functionality.

Herein.

Figure 1:
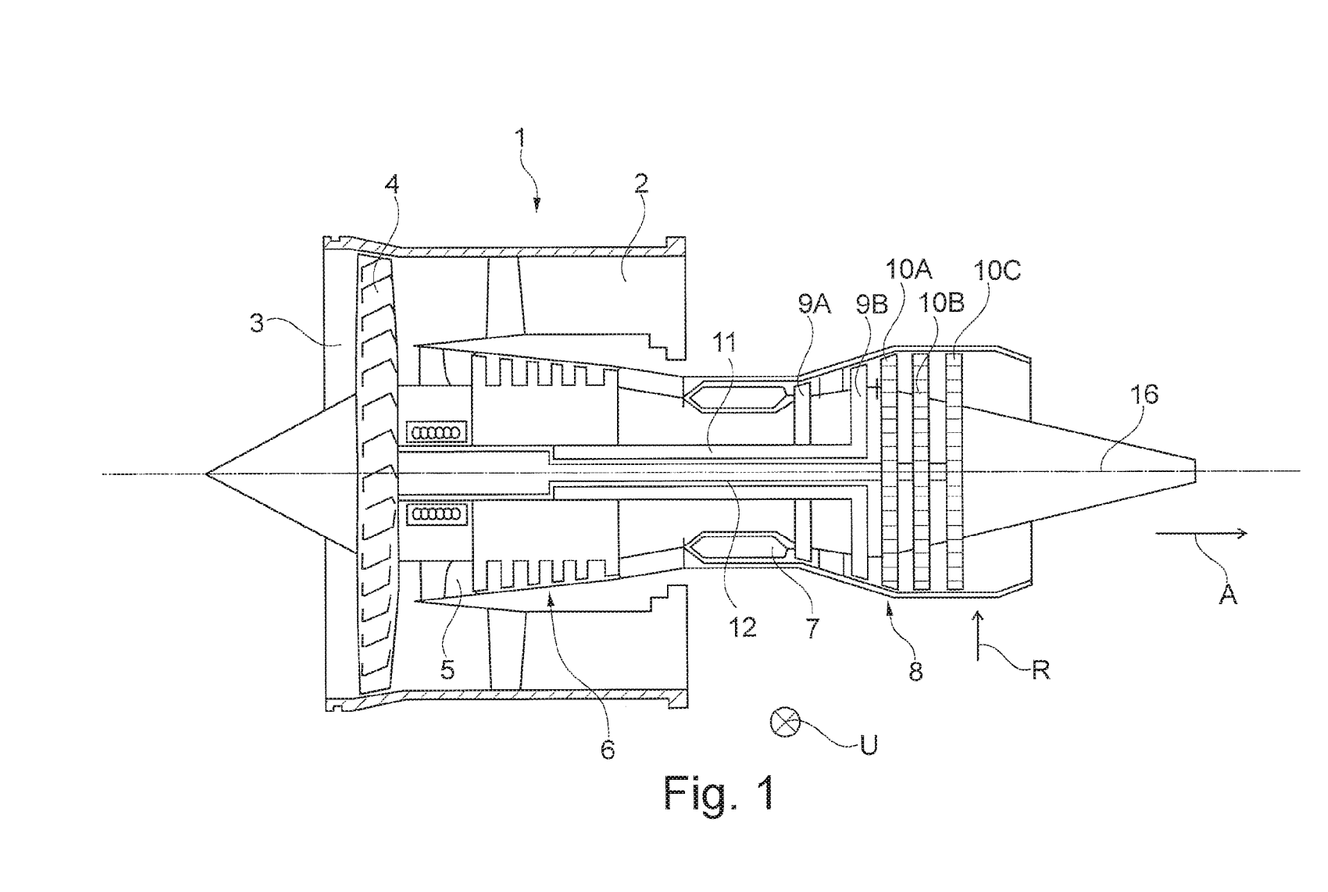
FIG. 1 shows a strongly schematized longitudinal section view of a jet engine of an aircraft comprising a turbine with multiple rotor devices.

FIG. 1 shows a turbomachine that is embodied as a jet engine 1 in longitudinal section view, wherein the jet engine 1 is embodied with an inlet area 3 and a bypass channel 2. A fan 4 connects to the inlet area 3 downstream in a per se know manner. In turn downstream of the fan 4, the fluid flow inside the jet engine 1 is divided into a bypass flow and a core flow, wherein the bypass flow flows through the bypass channel 2 and the core flow flows into the engine core or core flow channel 5, which again is embodied in a conventional manner with a compressor appliance 6, a burner 7, and a turbine appliance 8.

Figure 2:
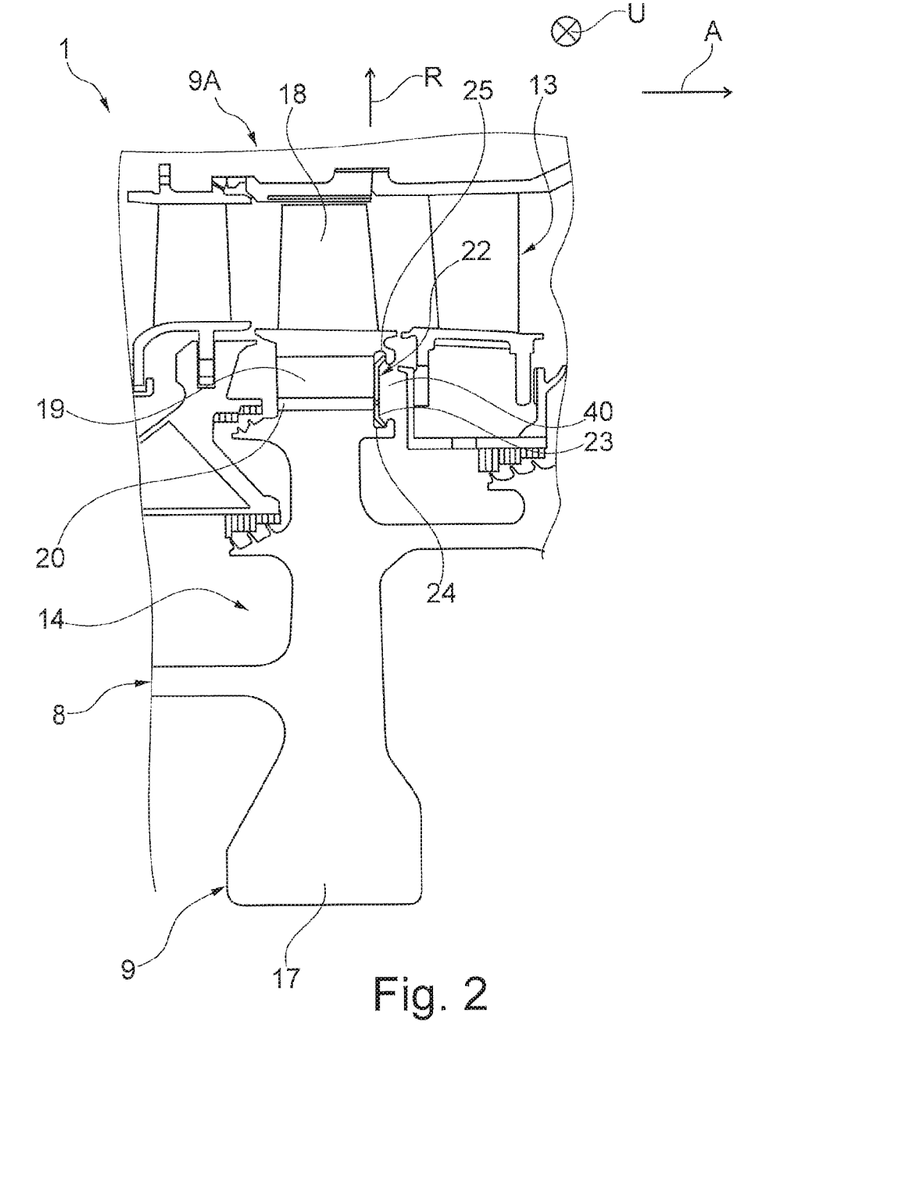
FIG. 2 shows a schematized section of the jet engine of FIG. 1 with a rotor device in which rotor blades are circumferentially arranged at a disc wheel and are respectively secured at the disc wheel in the axial direction by means of a securing appliance.

In the present case, the turbine appliance 8 is embodied in multi-stage design with two high-pressure rotor devices 9A, 9B and three substantially comparatively constructed low-pressure rotor devices 10A, 10B, 10C, of which the rotor device 9A can be seen in more detail in FIG. 2. The high-pressure rotor devices 9A, 9B are connected to the compressor appliance 6 via a high-pressure shaft 11, whereas the low-pressure rotor devices 10A, 10B, 10C are connected to the fan 4 by means of a low-pressure shaft 12.

Here, the rotor device 9A and a stator device 13 that is arranged upstream of the rotor device 9A in the axial direction A of the jet engine 1 form a first stage 14 of the turbine appliance 8.

The rotor device 9A is embodied with a centrally arranged disc wheel 17 that is connected to the high-pressure shaft 11 and mounted so as to be rotatable about a central axis or middle axis 16. A plurality of rotor blades 18 is circumferentially arranged at the disc wheel 17 in radially outer areas. For this purpose, the rotor blades 18 respectively have a blade root 19 which is formed with a so-called fir tree profile and by means of which they are respectively arranged in a per se known manner inside recesses 20 of the disc wheel 17 extending inside the disc wheel 17 substantially in the axial direction. Here, respectively one finger-like web 21 is formed at the wheel head of the disc wheel 17 between two recesses 20 of the disc wheel 17 that are adjoining each other in the circumferential direction U, comprising a correlating shaft profile at its shoulder for interaction with the blade roots.

Alternatively, it can also be provided that multiple rotor blades 18, arranged so as to be adjoining in the circumferential direction U of the jet engine 1, are arranged inside a recess 20 of the disc wheel 17 via a common blade root 19.

For axially securing the rotor blades 18 with respect to the disc wheel 17, a securing appliance 22 is provided, in the present case at a downstream end of the rotor device 9A. Here, the flow direction refers to the working gas inside the core flow channel 5, which substantially flows in the axial direction A of the jet engine 1. The securing appliance 22 has multiple securing segments 23 that act together in the circumferential direction U and are constructed in a substantially identical manner, wherein in the present case a securing segment 23 simultaneously acts together in the circumferential direction U with four recesses 20 of the disc wheel 17 and the blade roots 19 of the rotor blades 18 arranged therein.

Figure 10:
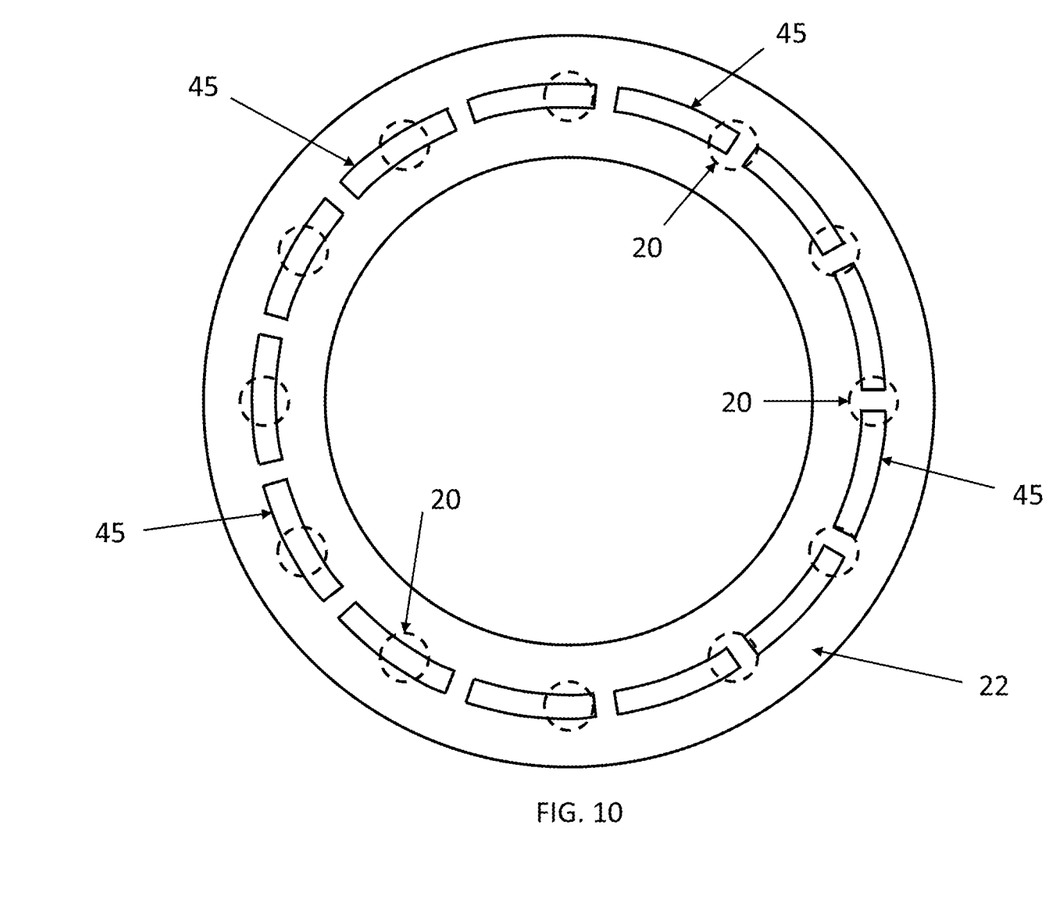
Fig 10 shows a schematic view of a single securing, where a number of a plurality of air flow recesses is coprime to a number of blade recesses.

In alternative embodiments of the invention, an extension of the securing segments 23 in the circumferential direction U can also be greater or smaller, so that a securing segment 23 can simultaneously act together with less or more recesses 20. The securing appliance 22 can also be a substantially completely ciircumferential securing ring. See Fig. 10

In the present case, the securing appliance 22 is axially held inside a circumferential groove 24 of the disc wheel 17 with an inner edge, referring to a radial direction R of the jet engine 1, and is held at the at the disc wheel 17 with the outer edge inside a circumferential groove 25 that is formed by all rotor blades 18.

Figure 3:
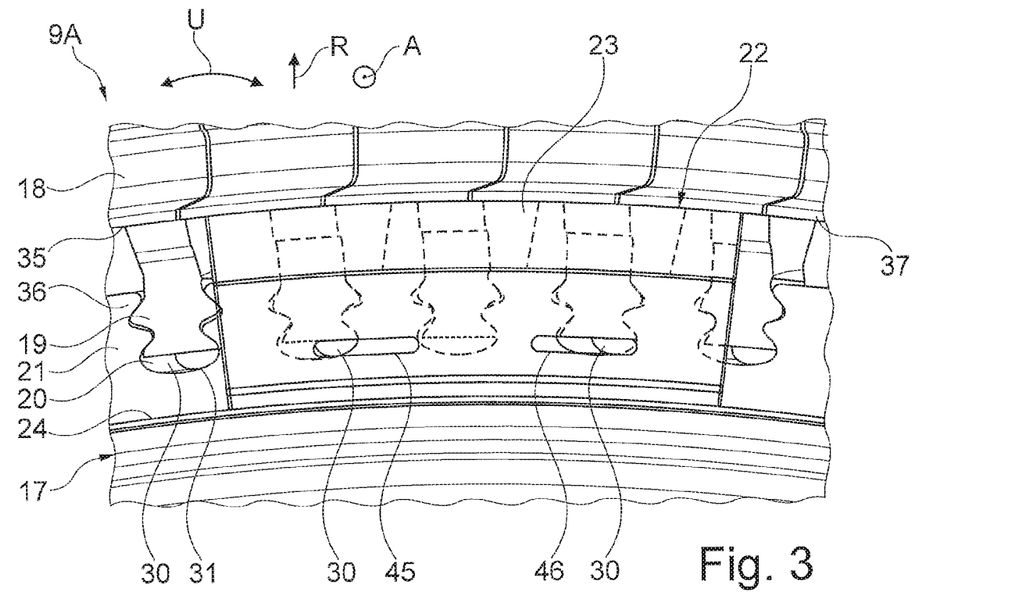
FIG. 3 shows a simplified top view of a part of the rotor device according to FIG. 2 in the axial direction, wherein a securing segment of the securing appliance having two recesses can be seen in more detail, with the securing appliance being shown only in certain areas.

As can be seen in more detail in FIG. 3, a flow channel 30 is formed by the recesses 20 of the disc wheel 17 together with respectively one blade root 19 of a rotor blade 18, extending in the radial direction R from a groove base 31, which is also referred to as a bucket groove area, of the disc wheel 17 up to an adjoining end of the respective blade root 19, and being delimited in the circumferential direction U by the two adjoining finger-like webs 21 of the disc wheel 17.

In addition, further flow channels 35 are provided that extend in the radial direction R from a head area 36 of the webs 21 of the disc wheel 17 up to a lower platform area 37 of the rotor blades 18, referring to the radial direction R, and that are delimited in the circumferential direction U by two blade roots 19 that are adjoining each other in the circumferential direction U. At that, the flow channels 35 are arranged in a so-called shank area.

Through the flow channels 30, 35 cooling air of a so-called secondary cooling air system is guided from an upstream side of the rotor device 9A to a downstream side of the rotor device 9A during operation of the jet engine 1, wherein the cooling air is also used for cooling the rotor blades 18, for example.

To facilitate a discharge of the cooling air guided through the flow channels 30 into a space 40 that is arranged downstream of the disc wheel 17 or the rotor blades 18, in the present case the securing segments 23 of the securing appliance 22, which abut substantially flatly at the downstream side of the disc wheel 17 and the rotor blades 18 in the area of the flow channels 30 and of which only one is shown, have respectively two recesses 45, 46.

Here, the recesses 45, 46 are respectively embodied in a slot-like manner as an oblong hole and extend substantially in the circumferential direction U, wherein a distance of the recesses 45, 46 to the central axis 16 is substantially identical. At than, the recesses 45, 46 are preferably embodied to be curved in the circumferential direction U in such a manner that a central line of the recesses 45, 46 represents a circle line about the central axis 16t. Here, the total number of recesses 45, 46 of all securing segments 23 of the securing appliance 22 is not equal the number of the recesses 20 of the disc wheel 17. Mathematically, it is advantageous where a number of the plurality of recesses 45, 46 is coprime to a number of the blade recesses 20. For example, a turbine fan can have a quantity of 12 rotor blades 18 and blade recesses 20 and the securing appliance can have 13 recesses 45. See FIG. 10.

Depending on a circumferential position of the securing appliance 22, each recess 45, 46 possibly has a free cross-sectional flow surface that is defined by an overlap of the recess 45, 46 with the respective flow channel 30, as viewed in the axial direction A. What thus results for all recesses 45, 46 is a total cross-sectional surface of the securing appliance passable by the flow 22.

The recesses 45, 46 on a circle line about the central axis 16 preferably have an extension or width in the circumferential direction U that is greater than a distance of adjoining recesses 20 of the disc wheel 17. In this manner, a free cross-sectional flow surface of each recess 45, 46 is smaller than a total cross-sectional surface of the respective recess 45, 46 in every operational state.

In embodiments with the same distribution between the blade roots 19 and the recesses of the securing appliance 22, X blade roots 19 are assigned to X or X*N recesses of the securing appliance 22.

If an uneven distribution is present between the blade roots 19 and the air-passing recesses of the securing appliance 22, the following relationships can apply:

with X blade roots e.g. (X+1) recesses of the securing appliance, or with X blade roots e.g. (X+1)*N recesses of the securing appliance, or with X blade roots e.g. (X−1) recesses of the securing appliance, or with X blade roots e.g. (X−1)*N recesses of the securing appliance, or with X blade roots e.g. (X+2) recesses of the securing appliance, or with X blade roots e.g. (X+2)*N recesses of the securing appliance, or with X blade roots e.g. (X−2) recesses of the securing appliance, or with X blade roots e.g. (X−2)*N recesses of the securing appliance, or etc.

with X blade roots e.g. (X+M) recesses of the securing appliance, or with X blade roots e.g. (X+M)*N recesses of the securing appliance, or with X blade roots e.g. (X−M) recesses of the securing appliance, or with X blade roots e.g. (X−M)*N recesses of the securing appliance, so that, independently of the angular position between the blade root 19 and the securing appliance 22, the entire total flow cross section is integrated to be constant across the entire circumference and thus completely independent of any securing devices against the displacement in the circumferential direction.

Therefore, a simple embodiment consists in providing X blade roots and X+1 or X−1 recesses, e.g. securing plates of the securing appliance 22, with an even distribution across the circumference. To minimize a circumferential dependence of the local cooling air mass flow, a preferred application would be to provide X blade roots 19 and a relatively large number of air-passing recesses in the securing plates (X+M)*N or (X−M)*N, with an even distribution across the circumference.

Thus, it is advantageous to chose the total number X of recesses 45, 46 to be greater by one or smaller by one than the total number of the blade roots 19.

The total cross-sectional surface of the securing appliance 22 that is passable by the flow is substantially independent of a circumferential position of the securing appliance 22, meaning that the total cross-sectional surface of the securing appliance 22 that is passable by the flow does not change even in the event of a twisting of the securing appliance 22 relative to the disc wheel 17 or to the rotor blades 18, since in case of a relative twisting of the securing appliance 22 a reduction of the free cross-sectional flow surface of individual recesses 45, 46 is substantially compensated for by increasing the free cross-sectional flow surface of other recesses 45, 46.

FIG. 4 to FIG. 9 show further embodiments of securing appliances 50, 70, 90, 100, 110, 120 that differ from the securing appliance 22 with respect to the arrangement, number and shape of the recesses. In the following, only the differences of the securing appliances 50, 70, 90, 100, 110, 120 to the securing appliance 22 are discussed, and otherwise the above description is referred to.

Figure 4:
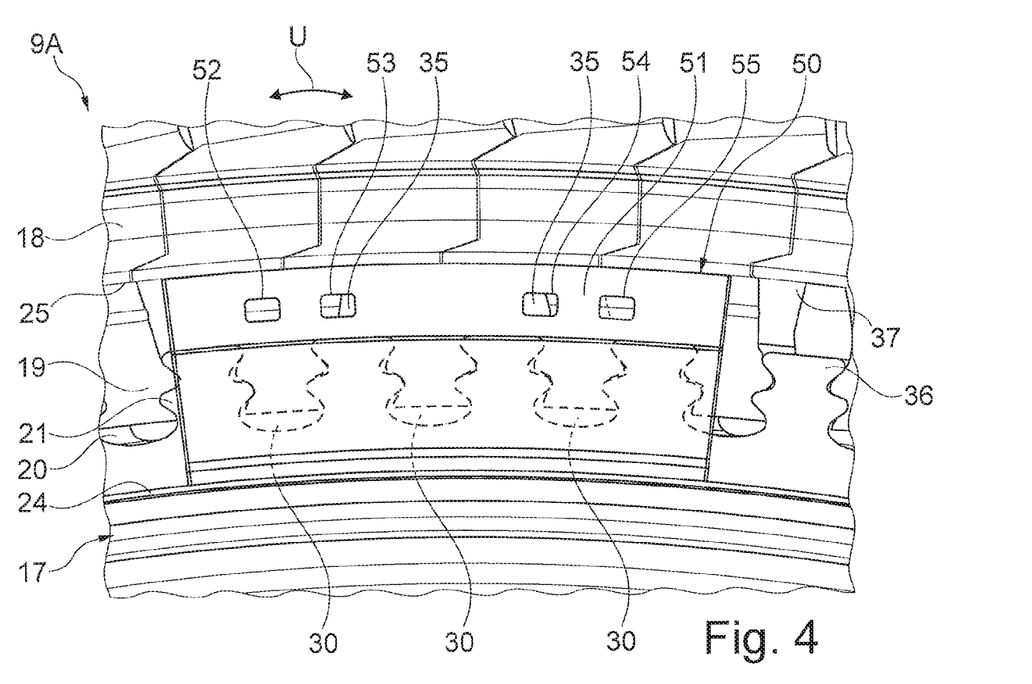
FIG. 4 shows a view of the rotor device according to FIG. 2 corresponding to FIG. 3, wherein a second embodiment of the recesses in the securing appliance can be seen.
Figure 5:
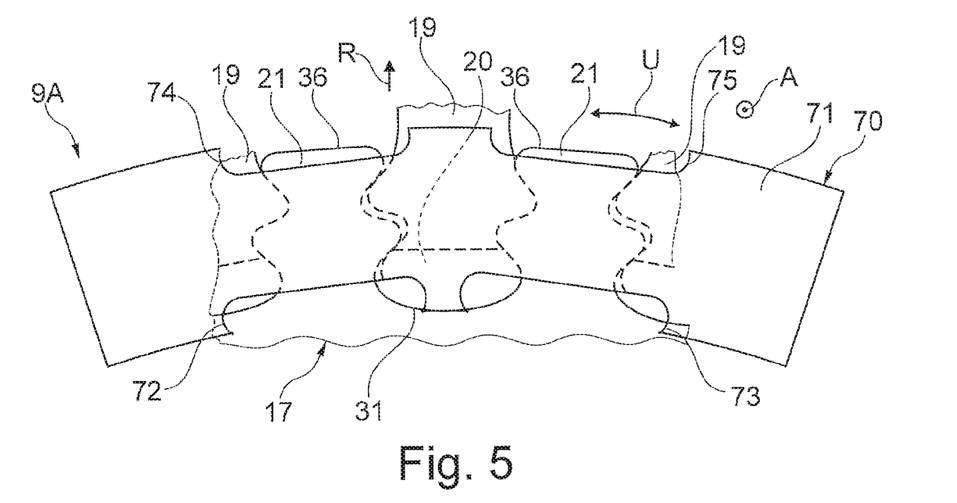
FIG. 5 shows a view of the rotor device that substantially corresponds to FIG. 3 and FIG. 4 with only schematically indicated rotor blades, wherein a third embodiment of the securing appliance can be seen.

In the securing appliance 50 shown in FIG. 4, each securing segment 51 has four respectively substantially rectangular or square recesses 52, 53, 54, 55, wherein the distance between the first recess 52 and the second recess 53 as well as between the third recess 54 and the fourth recess 55, as viewed in the circumferential direction U, is smaller by a multiple than the distance between the second recess 53 and the third recess 54. All recesses 52, 53, 54, 55 are arranged on a pitch circle about the central axis 16, wherein presently the radius of this circle line is chosen in such a manner that, in contrast to the recesses 45, 46 of FIG. 3, the recesses 52, 53, 54, 55 act together with the flow channels 35 in the head area 36 of the webs 21 of the disc wheel 17. Here, too, the number and size of the recesses 52, 53, 54, 55 is chosen such that the total free cross-sectional surface of the securing appliance 50 is substantially independent of any twisting of the securing appliance 50 relative to the disc wheel 17 or the rotor blades 18.

In a securing segment 71 of a securing appliance 70 that is shown in FIG. 5 again four recesses 72, 73, 74, 75 are provided, wherein two recesses 72, 73 are arranged on a pitch circle with such a distance to the central axis 16 that they act together with the flow channels 30 at the groove base 31 of the recesses 20, and the other two recesses 74, 75 are positioned on a pitch circle with a greater distance to the central axis 16, so that they act together with the flow channels 35 in the head area 36 of the webs 21. While in the previous embodiments the recesses were respectively openings with a closed edge, here the recesses 72, 73, 74, 75 are respectively designed to be open towards an inner edge area or an outer edge area of the securing segment 71, as viewed in the radial direction R, thus themselves forming the respective edges of the securing segment 71 in the respective circumferential area of the recesses 72, 73, 74, 75.

Figure 6:
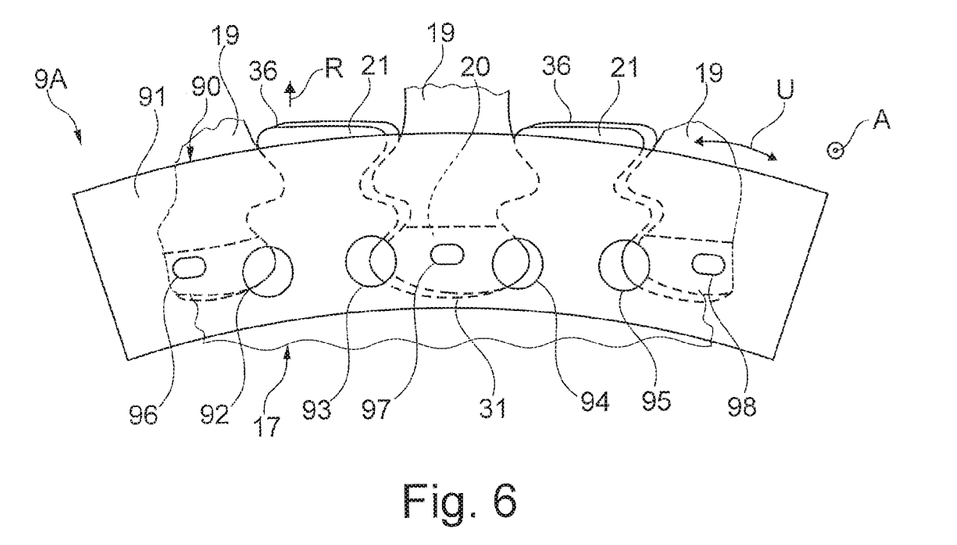
FIGS. 6 to 9 show views of the rotor device corresponding to FIG. 5 with further embodiments of the securing appliance.

FIG. 6 shows a securing segment 91 of a securing appliance 90, wherein the securing segment 91 has circular recesses 92, 93, 94, 95 as well as slot-shaped recesses 96, 97, 98, wherein all recesses 92 to 98 have a substantially comparable distance to the central axis 16 and are provided for acting together with the flow channels 30 in the groove base 31. Depending on the circumferential position of the securing appliance 90, respectively two circular recesses 92, 93 or 94, 95 partially overlap with a web 21 of the disc wheel 17, or one circular recess of the same completely overlaps with the web 21, while the respectively other circular recess is opened completely towards the flow channel 30. Hence, the respectively free cross-sectional flow surface remains substantially identical.

In the present case, a distance between two slot-shaped recesses 96, 97, 98 is substantially identical, as viewed in the circumferential direction U, wherein two circular recesses 92, 93 or 94, 95 are respectively arranged within this distance.

Figure 7:
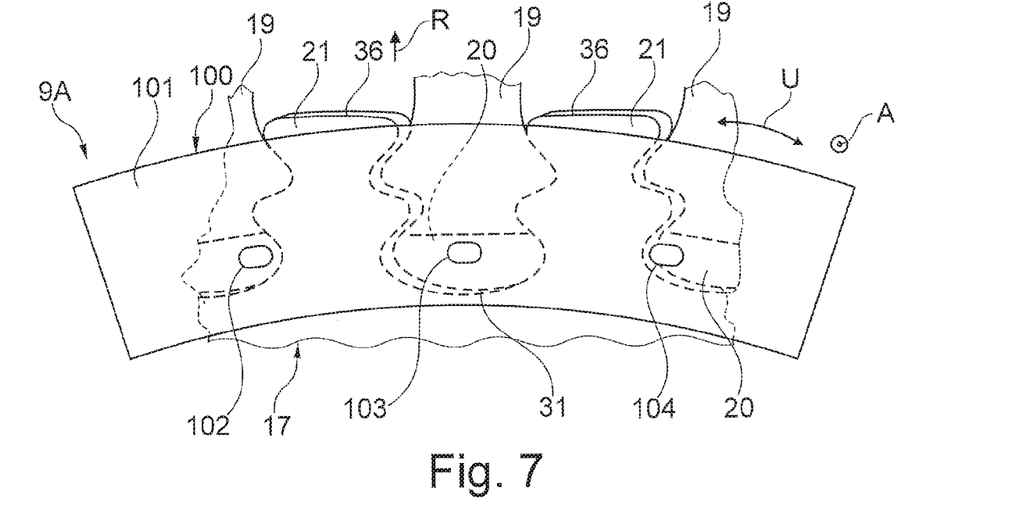

In the present case, a securing segment 101 of a securing appliance 100, which is shown in more detail in FIG. 7, has three slot-like recesses 102, 103, 104, with their extension in the circumferential direction U presently being approximately twice an extension in the radial direction R. The recesses 102, 103, 104 all have a substantially identical distance to the central axis 16, wherein in the present case a total number of the recesses 102, 103, 104 of the securing appliance 100 is higher by the value of 1 than the total number of the recesses 20 of the disc wheel 17.

Figure 8:
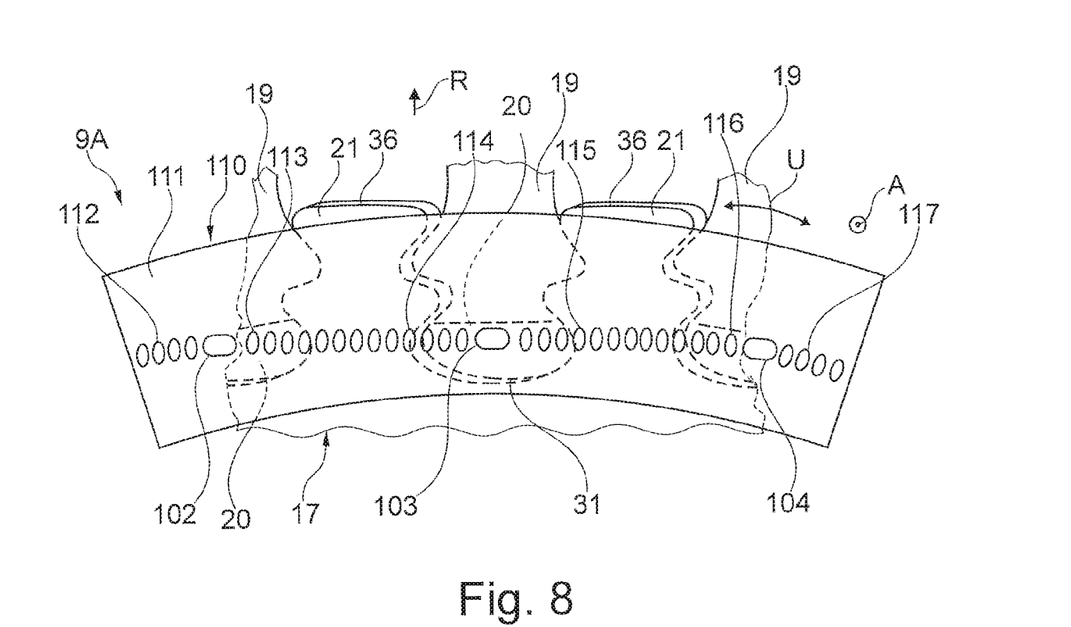

In addition to the slot-like recesses 102, 103, 104 that are located on a pitch circle, the securing segment 111 of a securing appliance 110 shown in FIG. 8 also has further recesses 112, 113, 114, 115, 116, 117 etc. of a smaller diameter, which are embodied in a manner comparable to the slot-like recesses 102, 103, 104, and which show a further design option. Together with the recesses 102, 103, 104, the additional recesses 112, 113, 114, 115, 116, 117 etc. form a kind of screen, so that the total cross-sectional surface that is passable by the flow remains approximately identical in the event that a twisting of the securing appliance occurs.

Figure 9:
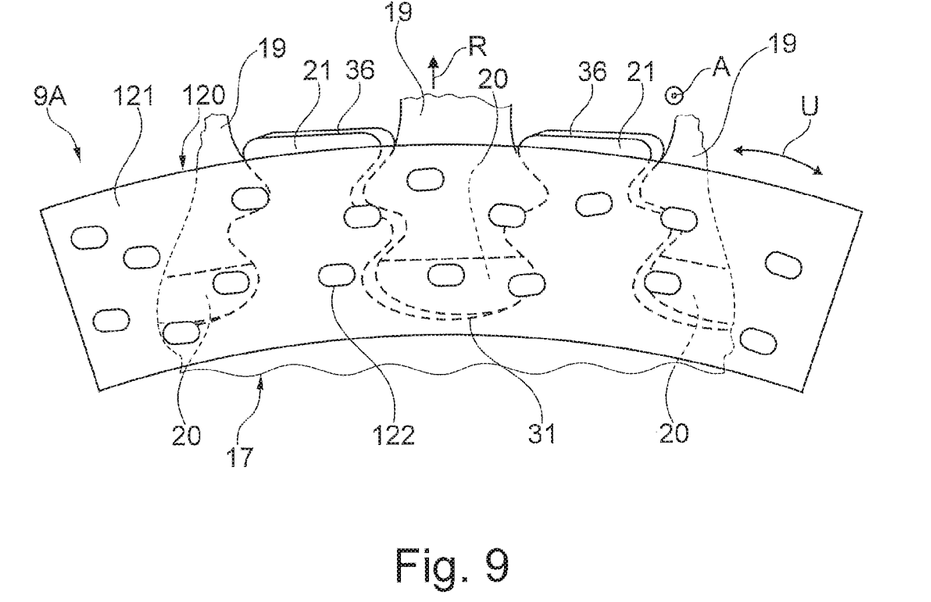

In the embodiment of a securing appliance 120 shown in FIG. 9, a securing element 121 has a plurality of recesses 122, which in the present case are arranged so as to be stochastically distributed in the circumferential direction U and in the radial direction R of the securing segment 121, wherein a design and arrangement of the recesses 122 is preferably realized by using numerical automated methods.

PARTS LIST 1 turbomachine; jet engine
2 bypass channel
3 inlet area
4 fan 5 core flow channel
6 compressor appliance
7 burner
8 turbine appliance
9A, 9B rotor device (high-pressure)
10A, 10B, 10C rotor device (low-pressure)
11 high-pressure shaft
12 low-pressure shaft
13 stator device
14 first stage of the turbine appliance
16 central axis
17 disc wheel
18 rotor blade
19 blade root
20 recesses of the disc wheel
21 web of the disc wheel
22 securing appliance
23 securing segment
24 groove of the disc wheel
25 groove of the rotor blade
30 flow channel
31 groove base of the recesses of the disc wheel
35 further flow channel
36 head area web
37 platform area of the rotor blades
40 space
45, 46 recesses of the securing appliance
50 securing appliance
51 securing segment
52 to 55 recesses of the securing appliance
70 securing appliance
71 securing segment
72 to 75 recesses of the securing appliance
90 securing appliance
91 securing segment
92 to 98 recesses of the securing appliance
100 securing appliance
101 securing segment
102, 103, 104 recesses of the securing appliance
110 securing appliance
111 securing segment
112 to 117 recesses of the securing appliance
120 securing appliance
121 securing segment
122 recesses of the securing appliance
A axial direction of the jet engine
R radial direction of the jet engine
U circumferential direction of the jet engine

The invention claimed is:

1. A rotor device of a turbomachine, comprising:
a disc wheel including a plurality of circumferentially arranged blade recesses,
a plurality of rotor blades including blade roots inside the blade recesses respectively, the blades roots being received by and retained by the blade recesses,
a securing ring comprising at least one chosen from a single ring and a plurality of ring segments, the securing ring attached to the disc wheel and fixing the plurality of rotor blades to the disc wheel in an axial direction, the securing ring including an outer face facing away from the disc wheel and an inner face facing toward the disc wheel
a plurality of flow channels is formed by the recesses of the disc wheel together with respective blade roots of the rotor blades, the plurality of flow channels extending predominately in the axial direction,
wherein the securing ring includes a plurality of air flow recesses extending therethrough from the outer face to the inner face and connecting to the plurality of flow channels,
a number and arrangement of the plurality of airflow recesses is configured such that a total cross-sectional surface of the securing ring passable by an air flow through the flow channel, is independent of a circumferential position of the securing ring relative to the disc wheel, the total cross-sectional surface being defined as a sum of an overlap of the plurality of airflow recesses with the plurality of flow channels;
wherein a number of the plurality of air flow recesses on a same pitch circle about a central axis of the rotor device differs from a number of the blade recesses.

2. The rotor device according to claim 1, wherein the securing ring includes a further plurality of air flow recesses extending therethough from the outer face to the inner face and connecting to a further plurality of flow channels that are arranged in a radial direction between a head area of webs of the disc wheel that form the blade recesses in a circumferential direction and a lower platform area of the rotor blades.

3. The rotor device according to claim 1, wherein a further plurality of air flow recesses are arranged on a further pitch circle about the central axis of the rotor device.

4. The rotor device according to claim 1, wherein all of the plurality of air flow recesses that have a same distance to the central axis are arranged in a uniformly distributed manner in a circumferential direction.

5. The rotor device according to claim 1, wherein at least a portion of the plurality of air flow recesses are formed on an edge area of the securing ring in the radial direction.

6. The rotor device according to claim 1, wherein at least one of the plurality of air flow recesses of the securing ring is slot-shaped and has a greater extension in a circumferential direction than a width of a web of the disc wheel that forms sides of adjacent ones of the blade recesses.

7. The rotor device according to claim 1, wherein a number of the plurality of air flow recesses is coprime to a number of the blade recesses.

8. The rotor device according to claim 1, wherein the securing ring is a single ring extending circumferentially around the disc wheel.

9. The rotor device according to claim 1, wherein the securing ring includes a plurality of ring segments sequentially arranged around a circumference of the disc wheel.

* * * * *